C. W. FOOTE.
SLED BRAKE.
APPLICATION FILED JAN. 24, 1913.
1,104,649.
Patented July 21, 1914.
2 SHEETS—SHEET 1.
Fig-1-
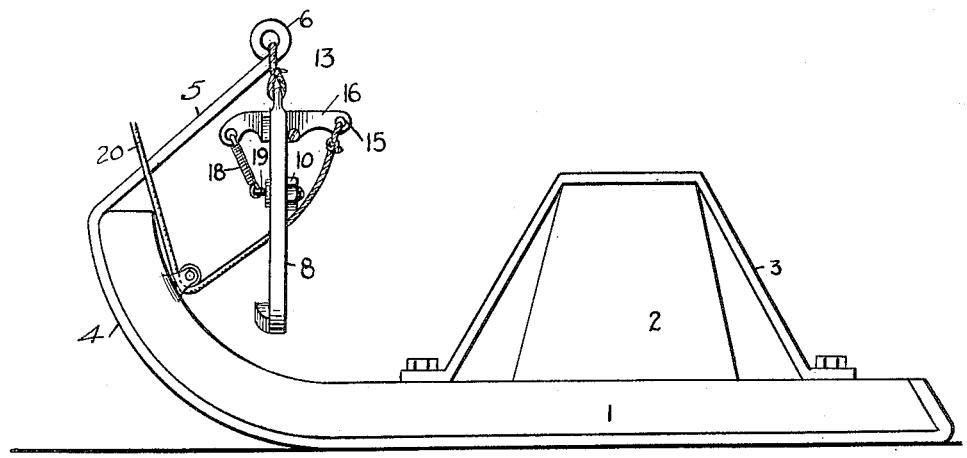
WITNESSES
Frank C. Palmer,
Wm. F. Nickel.
INVENTOR
Colin W. Foote
BY Munn & Co.
ATTORNEYS C. W. FOOTE.
SLED BRAKE.
APPLICATION FILED JAN. 24, 1913.
1,104,649.
Patented July 21, 1914.
2 SHEETS—SHEET 2.
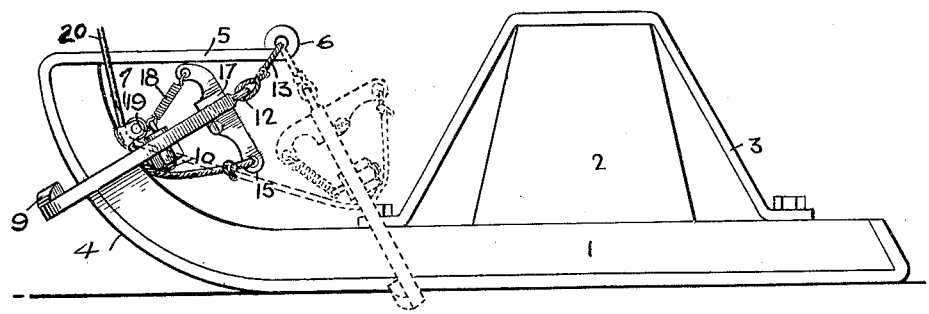
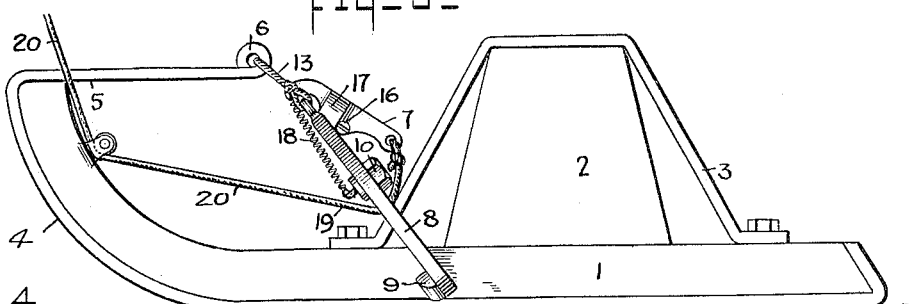
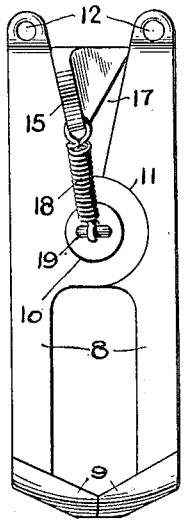
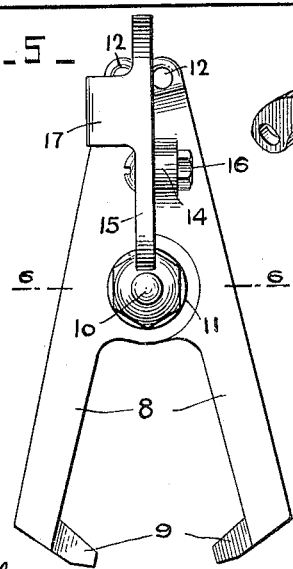
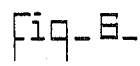
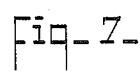
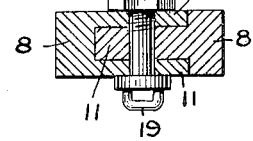
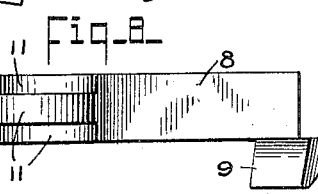
WITNESSES
Frank C. Palmer
Wm. F. Nickel
INVENTOR
Colin W. Foote,
BY Munn&Co
ATTORNEYS

UNITED STATES PATENT OFFICE.

COLIN WALTER FOOTE, OF ROCHESTER, MICHIGAN.

SLED-BRAKE.

1,104,649.     Specification of Letters Patent.     Patented July 21, 1914.

Application filed January 24, 1913. Serial No. 743,952.

*To all whom it may concern:*

Be it known that I, COLIN WALTER FOOTE, a citizen of the United States, and a resident of Rochester, in the county of Oakland and State of Michigan, have invented a new and Improved Sled-Brake, of which the following is a full, clear, and exact description.

My invention relates to a brake for sleds, and the object thereof is to provide a device of the kind mentioned which will engage the snow under the runners of the sled and thus prevent the forward movement thereof.

The brake is normally suspended on the sled in such position that it will be above the level of the snow, and so arranged that it can be controlled by the person on top of the load, and allowed to move downward beneath the runners to give the desired result.

Reference is to be had to the accompanying drawings forming a part of this specification, in which the same characters of reference indicate the same parts in all the views.

Figure 1 is a side elevation of the runner of a sled, showing my brake attachment out of operative position. Fig. 2 is a side elevation showing the brake ready for use. Fig. 3 is a similar view showing the brake ready to be moved back to starting position; Fig. 4 is a front view of the brake device; Fig. 5 is a rear view of the same; Fig. 6 is a view of a detail which is used to spread the brake shoes; Fig. 7 is a view on the line 6—6 of Fig. 5; and Fig. 8 is a side elevation of the braking device seen from the right of Fig. 2, with the detail shown in Fig. 5 omitted.

My invention is adapted to be used on sleds of all descriptions, but I have designed the same especially for use on bob sleds and the like which are used in cold climates for the transportation of logs and other loads over snow-covered ground.

The drawings show simply a sled runner 1 having a post 2 which is braced by means of an iron strap 3, and to this post the body of the sled may be secured. The sled of course may comprise a pair of runners of the kind shown at 1 at the front, and a similar pair at the back. The type of sled, however, is not material, as the brake attachment is applicable to any sled and will operate as well with one type as with another.

I prefer to bend the upper ends of the runner irons 4 backward in front, as shown at 5, and form at the ends of the sections 5 eyelets 6. From these eyelets the braking device indicated as a whole by the numeral 7 is suspended, one of these braking devices being used at each side of the sled adjacent the forward ends of the runners therefor, each braking device operating to prevent the movement of the runner with which it is associated.

The sections 5 of the runners are resilient, and normally they will occupy the position shown in Fig. 1. They may be tapered or made thinner than the body of the runner irons 4 for this purpose, so that they can easily be pulled down when the brake is to be put into use. Instead of these resilient ends I may of course employ a bar connected to the end of the runner irons by means of a spring joint which will serve the same purpose.

The braking attachment in question comprises a pair of arms 8 having ends 9 extending toward each other and pivoted together intermediate their lengths by a bolt 10 passing through lugs 11. One of these arms 8 will have two of these lugs and the other arm having a single lug fitting between them, and when connected together by the bolt 10 they will form a pair of tongs. The upper ends of the arms will terminate in eyelets 12, and these eyelets will be connected to the eyelets 6 of the associated runner by means of any flexible member shown at 13. Normally, the position of the brake will be such as to straddle the runner, and when the arms are spread apart at their upper ends the ends 9 will be adapted to pass under the runners so as to clog the same and prevent their movement through the snow, and thus bring the sled to a stop.

In order to control the position of the arms 8 with respect to each other I provide one of these arms with a lug 14 which is perforated, and pivotally secured thereto by means of this lug and a suitable bolt 16 is a lever 15 which has a projection 17. This projection is normally located between the upper ends of the arms 8, and when it is moved so as to push the projection 17 between the upper ends of the arms it will act as a wedge to force the arms apart at the top and together at the bottom, so as to move the projections 9 toward each other.

The lever 15 is normally held in such position as to force the projection 17 between the arms 8 by means of a spring 18 secured to the front end of the lever at one end and to a staple 19 which may be integral with the head of the bolt 10 at the other. A cord 20 is attached to the other end of the lever 15 and passes downward therefrom between the arms 8, and then upward to within reach of a person riding on the sled, to enable the latter to control the same.

The utility and mode of operation of the brake attachment will now be apparent. Normally it will be suspended in the position shown in Fig. 1. The resilient section 5 will hold it above the runner 1 and the spring 18 will keep the wedge 17 between the upper ends of the arms 8, so as to hold the lugs 9 together. When it is desired to employ the brake the person riding on the load carried by the sled will pull the rope or cord 20, giving it a smart jerk to throw the wedge 17 out of position. This jerk will also carry the brake attachment forward. If the lever 15 be not moved immediately the brake attachment will swing to the front until the ends 9, which are held together, strike the top of the runner 1 and arrest the brake attachment against further forward movement. The pull will now become effective upon the lever 15, removing the wedge 17 and permitting the lower ends of the arms 8 to swing apart, this position being shown in Fig. 4. The rope 20 will now carry the attachment farther to the front, the arms 8 receiving the runner 1 between them and the projection 9 coming into position to pass around the runner iron in front. Easing the pull on the rope now permits the spring 18 to return the wedge 17 between the adjacent ends of the arms 8, forcing the projections together in front of the runner. This is the position shown in full lines on Fig. 2. The sled moving forward through the snow, the brake will be forced along the bottom of the runner to the rear, pulling the section 5 down to horizontal position, owing to the resilience thereof, until the brake reaches the broken line position shown in Fig. 2. The sled can now be retarded or stopped.

In order to bring the brake back to its original position the cord 20 is again pulled and the tension thereon overcomes the force of the spring 18. This moves the projection out from between the adjacent ends of the arms 8 and allows these arms to spread apart, so as to be moved away from beneath the runners. The resilience of the sections 5 will now lift these arms, and when the tension on the rope 20 is eased the wedge 17 will be moved back. The parts will thus be restored to the position shown in Fig. 1.

It will of course be understood that when the sled brake is to be thrown to release position, that is, from the broken-line position in Fig. 2 to the position shown in Fig. 3, the action of the snow will be sufficient when the lever 15 is moved against the spring 18, to drive the projections 9 away from under the runner.

Of course, a suitable spring may be employed to engage the arms 8 and be so arranged as to tend to move the lower ends of these arms apart. This spring of course will be weaker than the spring 18, if employed, so that the arms will be normally held together near the bottom and be moved apart at their lower ends only when the spring 18 is overcome by pulling on the cord 20. It thus appears that my invention is well adapted for the stopping of the sled and it can be controlled by the operator on the top of the load without necessitating his leaving his seat. One of these brakes will be used at either side of the sled at the front, and they can be moved into or out of braking relation at will.

Having thus described my invention, I claim as new and desire to secure by Letters Patent:

1. A brake device for the running gear of a vehicle, resilient means for suspending said device, and means for moving the same into position to enable it to be forced against the action of said resilient means between the running gear and the surface over which the vehicle moves.

2. A braking device for the running gear of a vehicle, said device being adapted to receive part of the running gear, resilient means for suspending said device, and means for moving the device into position to enable it to be forced against the action of the resilient means between the running gear and the surface over which the vehicle moves.

3. The combination of a pair of arms, means for pivotally connecting said arms together, a lever pivoted to one of said arms and having a wedge to pass between the same on one side of said pivot and spread the adjacent ends of said arms apart, resilient means for holding said lever in such spreading position, and projections on the opposite ends of said arms extending toward each other.

4. In a brake device, the combination of a pair of arms pivoted together, a lever pivoted to one arm to swing between the said arms and having a wedge-shaped projection thereon, and a spring having one end secured to one end of the lever and its other end connected to the said arms.

5. In a brake device, the combination of a pair of arms pivoted together intermediate of their ends, said arms having openings in their upper ends and inwardly projecting members at their lower ends, a lever pivoted intermediate its ends to one of the arms to swing between the said arms and having a wedge-shaped projection thereon, and a spring having one end secured to one end of the lever and its other end to an eye on the pivot of the said arms.

6. In a brake device, the combination with a runner, of a pair of suspended arms pivoted together and provided with inwardly projecting members at their lower ends, and means for swinging the arms forward with the arms on opposite sides of the runner and closing the said arms around said runner.

7. In a brake device, the combination with a runner, of a pair of arms pivoted together and having inwardly extending members at their lower ends, means for resiliently suspending the arms above the runner, and means for swinging the arms forward with the arms on opposite sides of the runner and closing said arms around the runner.

8. In a brake device, the combination of a runner having a rearwardly extending spring arm at its front end, a pair of arms pivoted together and having inwardly extending members at their lower ends, means for suspending the arms from the spring arm of the runner, a lever pivoted to one of the arms to swing between the said arms and having a wedge-shaped projection thereon, a spring secured to one end of the lever and to the said arms, and a cable secured to the other end of the lever.

In testimony whereof I have signed my name to this specification in the presence of two subscribing witnesses.

COLIN WALTER FOOTE.

Witnesses:
JULIAN S. PETERS,
HAZEL ATKINSON.

Copies of this patent may be obtained for five cents each, by addressing the "Commissioner of Patents, Washington, D. C."